(12) United States Patent
Lin et al.

(10) Patent No.: US 7,641,512 B2
(45) Date of Patent: Jan. 5, 2010

(54) ELECTRONIC DEVICE

(75) Inventors: Tzu-Wei Lin, Taipei (TW); Chen-Ming Sun, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 11/755,751

(22) Filed: May 31, 2007

(65) Prior Publication Data

US 2007/0281510 A1    Dec. 6, 2007

(30) Foreign Application Priority Data

Jun. 1, 2006    (TW)    ............................. 95119332 A

(51) Int. Cl.
*H01R 13/60*    (2006.01)

(52) U.S. Cl. ...................................... 439/528

(58) Field of Classification Search ................ 439/74, 439/528, 283, 353, 324, 131; 361/728, 738, 361/737, 740, 748, 752, 796, 801
See application file for complete search history.

(56) References Cited

U.S. PATENT DOCUMENTS 5,920,459 A * 7/1999 Weber et al. ................. 361/752
6,089,908 A * 7/2000 Huang ........................ 439/528
7,307,849 B2 * 12/2007 Ho et al. ..................... 361/737
2005/0287852 A1 * 12/2005 Sugawara et al. ........... 439/135

FOREIGN PATENT DOCUMENTS

CN    2375997    4/2000
CN    2550830    5/2003

OTHER PUBLICATIONS

"1st Office Action of China counterpart application", issued on Apr. 17, 2009, p. 1-p. 6.

* cited by examiner

*Primary Examiner*—Edwin A. Leon
(74) *Attorney, Agent, or Firm*—Jianq Chyun IP Office

(57) ABSTRACT

An electronic device including a circuit board, a first housing, a second housing, and a third housing is provided. The circuit board has at least one connector on at least a first side of the circuit board. The first housing and the second housing are connected and form a containing space and an opening. The circuit board is disposed in the containing space and the first side thereof is at the opening. In addition, the third housing covers the opening and has at least one connector hole. Furthermore, the connector is at the connector hole. The housings of the electronic device are easy to be assembled and maintained and the cost of replacement is low.

11 Claims, 9 Drawing Sheets

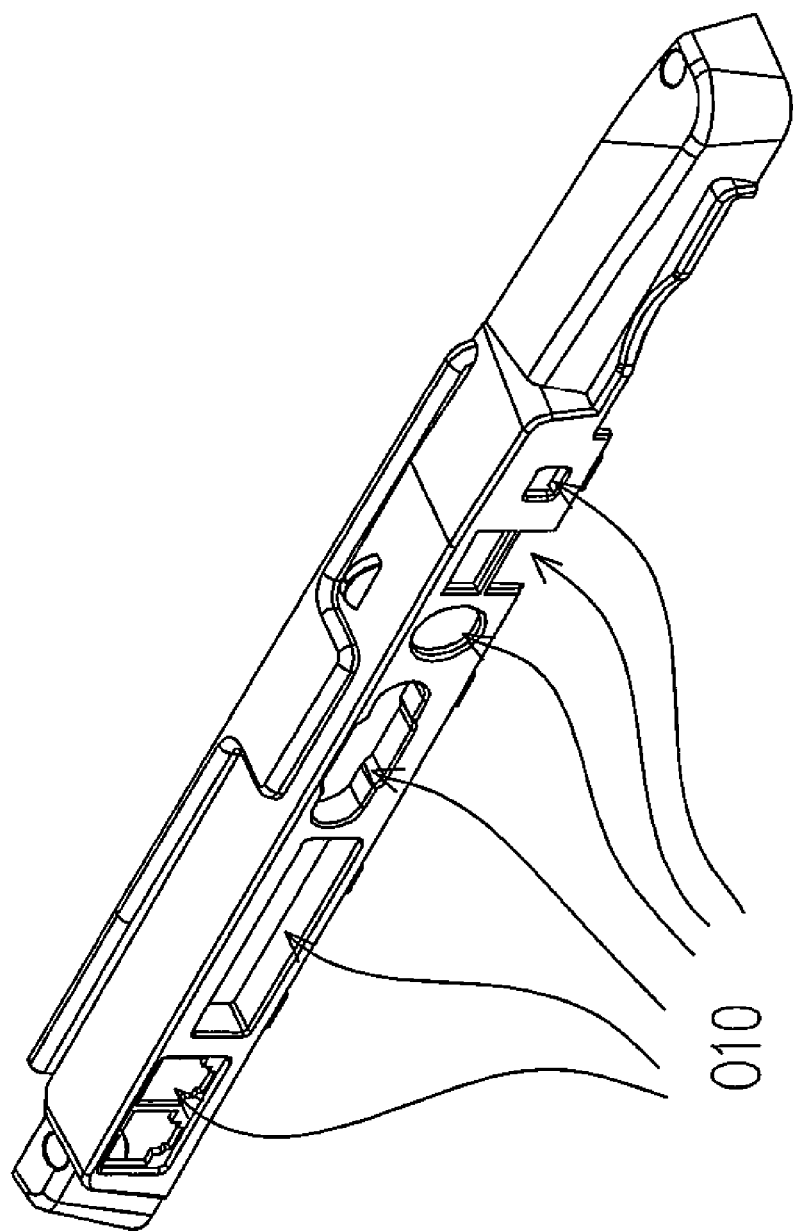

ELECTRONIC DEVICE

CROSS-REFERENCE TO RELATED APPLICATION

This application claims the priority benefit of Taiwan application serial no. 95119332, filed Jun. 1, 2006. All disclosure of the Taiwan application is incorporated herein by reference.

BACKGROUND OF THE INVENTION

1. Field of the Invention

The present invention relates to an electronic device. More particularly, the present invention relates to an electronic device which is easy to be assembled and maintained and has low assembly and maintenance cost.

2. Description of Related Art

Along with the development of electronic industry, the functions of electronic devices are increasing rapidly, and the appearances of various electronic devices are becoming lighter, slimmer, shorter, and smaller. With notebook computer as example, which can be used anywhere, anytime because of its portability. Notebook computer has much smaller volume than desktop computer and is becoming the mainstream of the market. However, notebook computer is less convenient in assembly, maintenance, or function upgrade than desktop computer due to the spatial structure thereof.

FIG. 1 is an exploded view of a conventional notebook computer. Referring to FIG. 1, the notebook computer has a structure of stacked layers, which includes a host 1, a top housing 11, a bottom housing 12, a motherboard 13, a keyboard 14, a touch pad 15, and a CPU 16. This notebook computer is assembled by assembling the motherboard 13, the CPU 16, the keyboard 14, and the touch pad 15 in sequence in the bottom housing 12 of the host 1. Then the top housing 11 is locked with the bottom housing 12. Thus, when users need to maintain or upgrade components in the notebook computer, for example, to fix the motherboard 13 or modules and CPU 16 on the motherboard 13, the top housing 11, bottom housing 12, and the internal components have to be disassembled. Accordingly, the design of the notebook computer in FIG. 1 may cause inconvenience in the maintenance of the notebook computer.

In addition, the motherboard 13 is usually disposed with a plurality of connectors (not shown) which receive power supply or transmit signals to/from external through the opening (not shown) of the bottom housing 12. However, usually different motherboard has different type of connectors or connector positions, thus, the bottom housing 12 has to be replaced too if the motherboard 13 needs to be replaced, which will increase the maintenance cost considerably.

SUMMARY OF THE INVENTION

Accordingly, the present invention is directed to provide an electronic device, wherein the design of the housings of the electronic device allows more convenient assembly, maintenance, and upgrade of the electronic device and reduces the replacement cost of the housings.

To achieve the aforementioned and other objectives, the present invention provides an electronic device including a circuit board, a first housing, a second housing, and a third housing. The circuit board has at least one connector on at least a first side of the circuit board. The first housing and the second housing are connected and form a containing space and an opening. The circuit board is disposed in the containing space and the first side of the circuit board is at the opening. In addition, the third housing covers the opening and has at least one connector hole. The connector is at the connector hole.

According to an embodiment of the present invention, at least a portion of the circuit board is between the first housing and the second housing, and the first side of the circuit board is at outside of the first housing and the second housing.

According to an embodiment of the present invention, the first, the second, and the third housings cover the circuit board all together.

According to an embodiment of the present invention, the third housing is connected to the first and the second housing. Wherein the first width of the first housing is substantially equal to the second width of the second housing, and the first housing and the second housing do not cover the connector.

According to an embodiment of the present invention, the connector is an I/O connector.

To achieve the aforementioned and other objectives, the present invention provides an electronic device including a circuit board, a first housing, a second housing, and a third housing. The circuit board has a first side and a second side. Wherein the first side and the second side are connected, and the first side has at least one connector. In addition, the second housing covers a portion of the second side, and the circuit board is between the first housing and the second housing. The third housing covers the first side and another portion of the second side of the circuit board and has at least one connector hole. Moreover, the connector is at the connector hole.

According to an embodiment of the present invention, the third housing includes a fourth housing and a fifth housing. The first, the second, and the fourth housing are connected and form an opening, and the first side of the circuit board is at the opening. Moreover, the fifth housing covers the opening and has a connector hole.

According to an embodiment of the present invention, the circuit board is disposed in the first housing.

According to an embodiment of the present invention, the width of the first housing is greater than the second width of the second housing. Besides, the first and the second housing do not cover the connector.

According to an embodiment of the present invention, the third housing is in L shape.

According to the present invention, the housings of the electronic device are easy to be disassembled or assembled, thus, it is convenient to maintain or upgrade the electronic device and easy for the customers to assemble the electronic device by themselves, and moreover, the cost for replacing the housings can be reduced.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2D is a perspective view of the fifth housing illustrated from a different angle as in FIG. 2C.

DESCRIPTION OF EMBODIMENTS

To resolve the problems in assembly, maintenance, or upgrade of conventional electronic device and reduce the cost thereof, the present invention provides an electronic device. The housings of the electronic device can be opened up partially to individually maintain or replace motherboard, any circuit board, or other modules. Besides, the housings have connector holes for containing connectors of the circuit board. When new circuit board is replaced, only the housing having the connector hole needs to be replaced if the new circuit board has different type of connector or connector position. Accordingly, the cost of housing replacement can be reduced since only small range of housings is to be replaced. Below the electronic device provided by the present invention will be described with reference to several embodiments.

Figure 1:
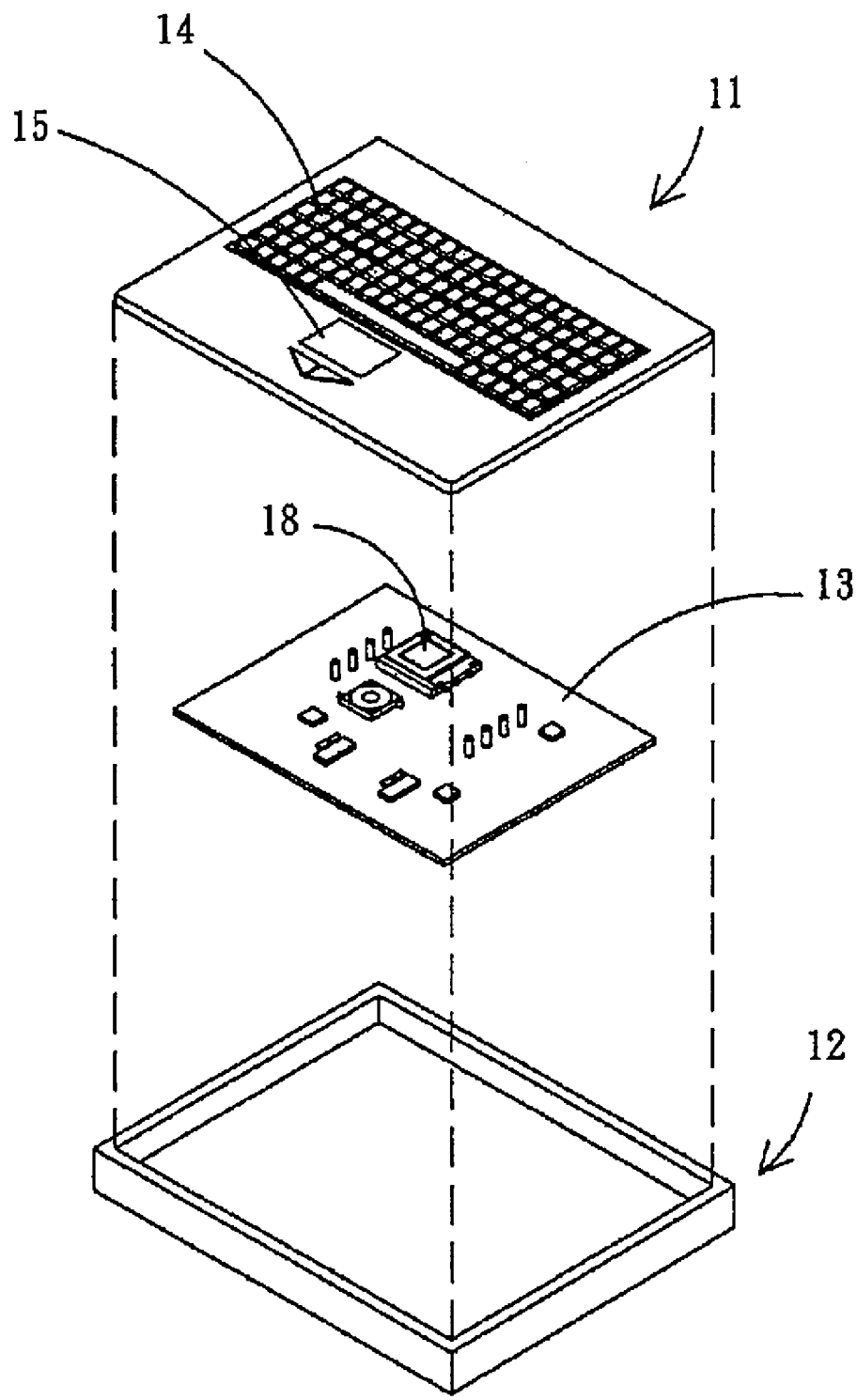
FIG. 1 is an exploded view of a conventional notebook computer.
Figure 2A:
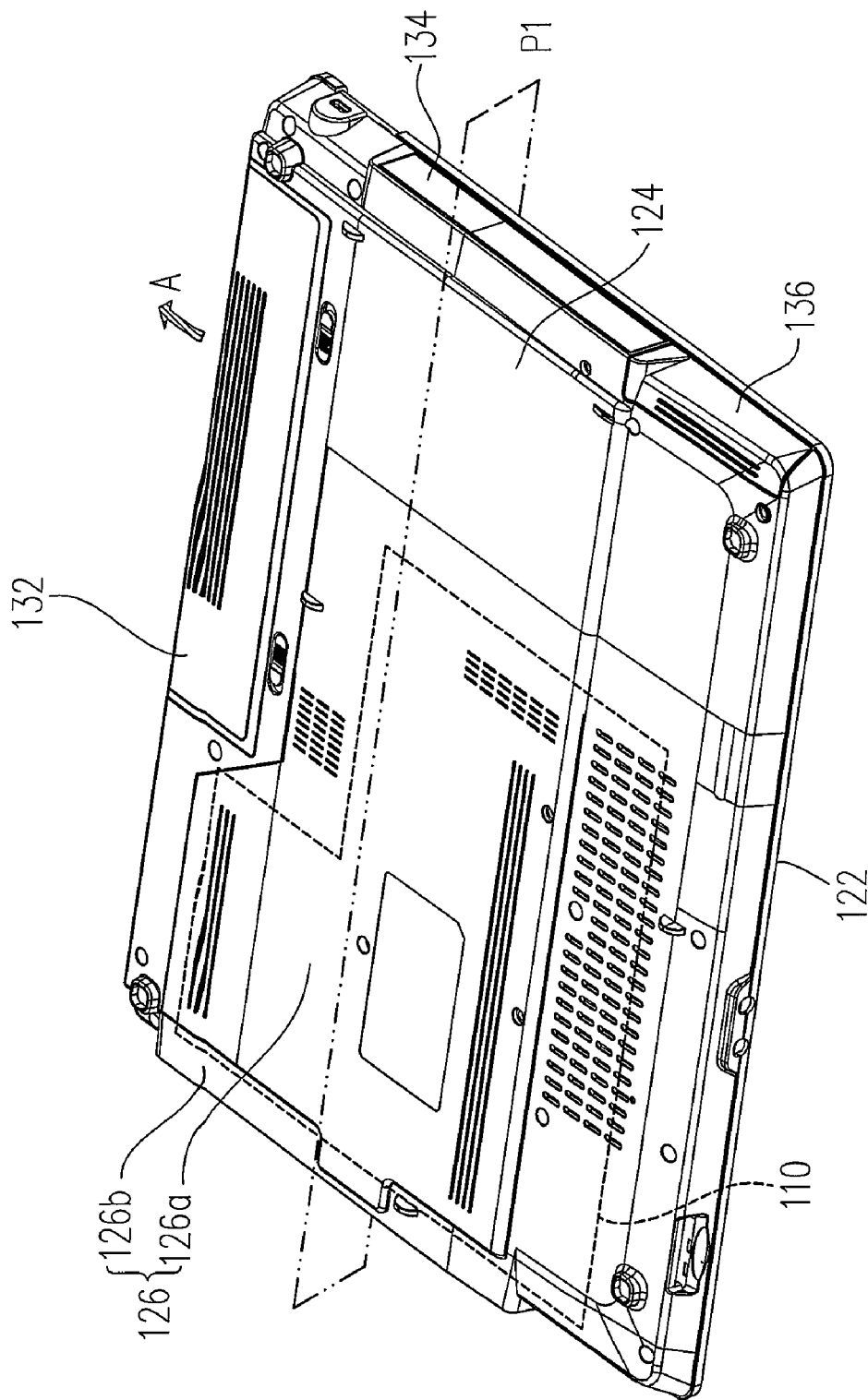
FIG. 2A is a perspective view of an electronic device according to an embodiment of the present invention.
Figure 2B:
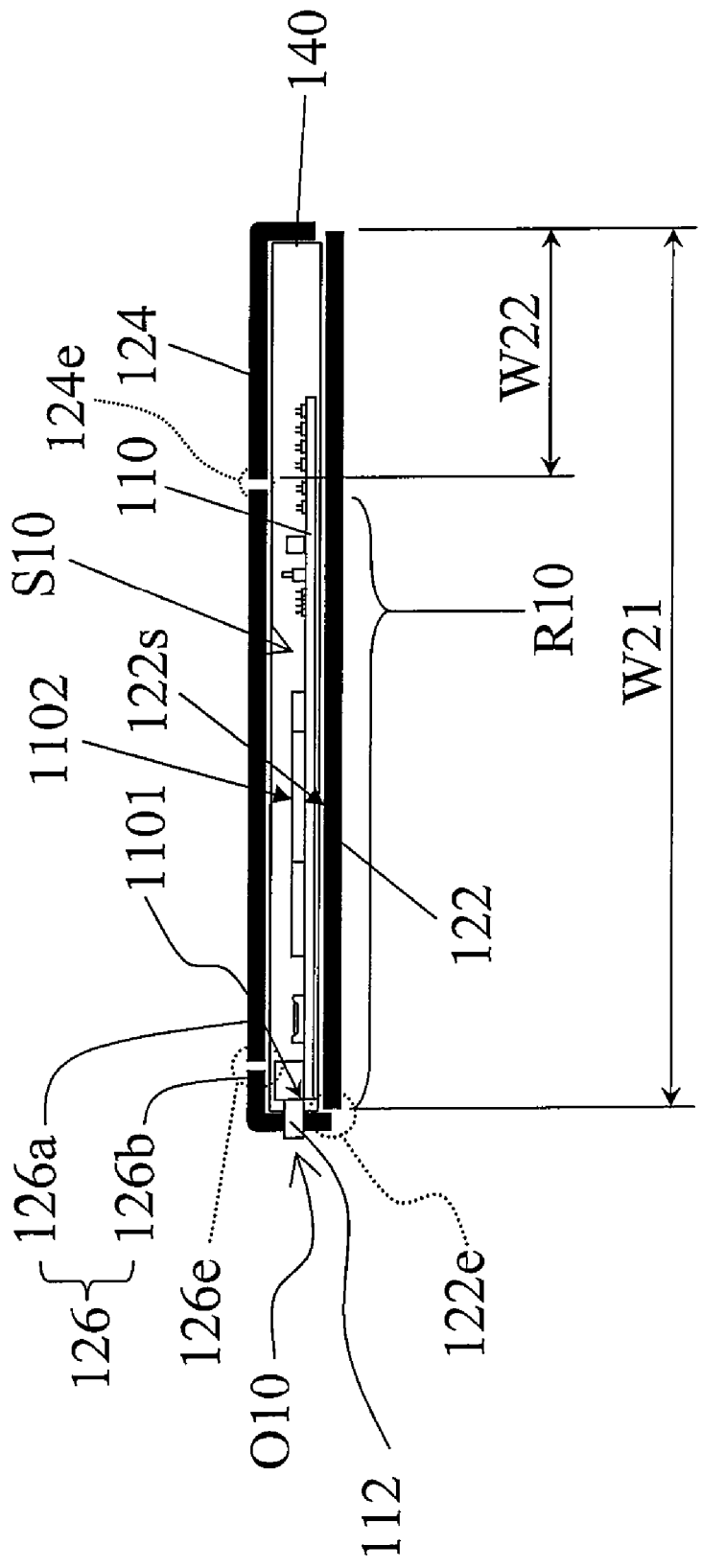
FIG. 2B is a cross-sectional view of FIG. 2A cut along plane P1 and observed along arrow A.
Figure 2C:
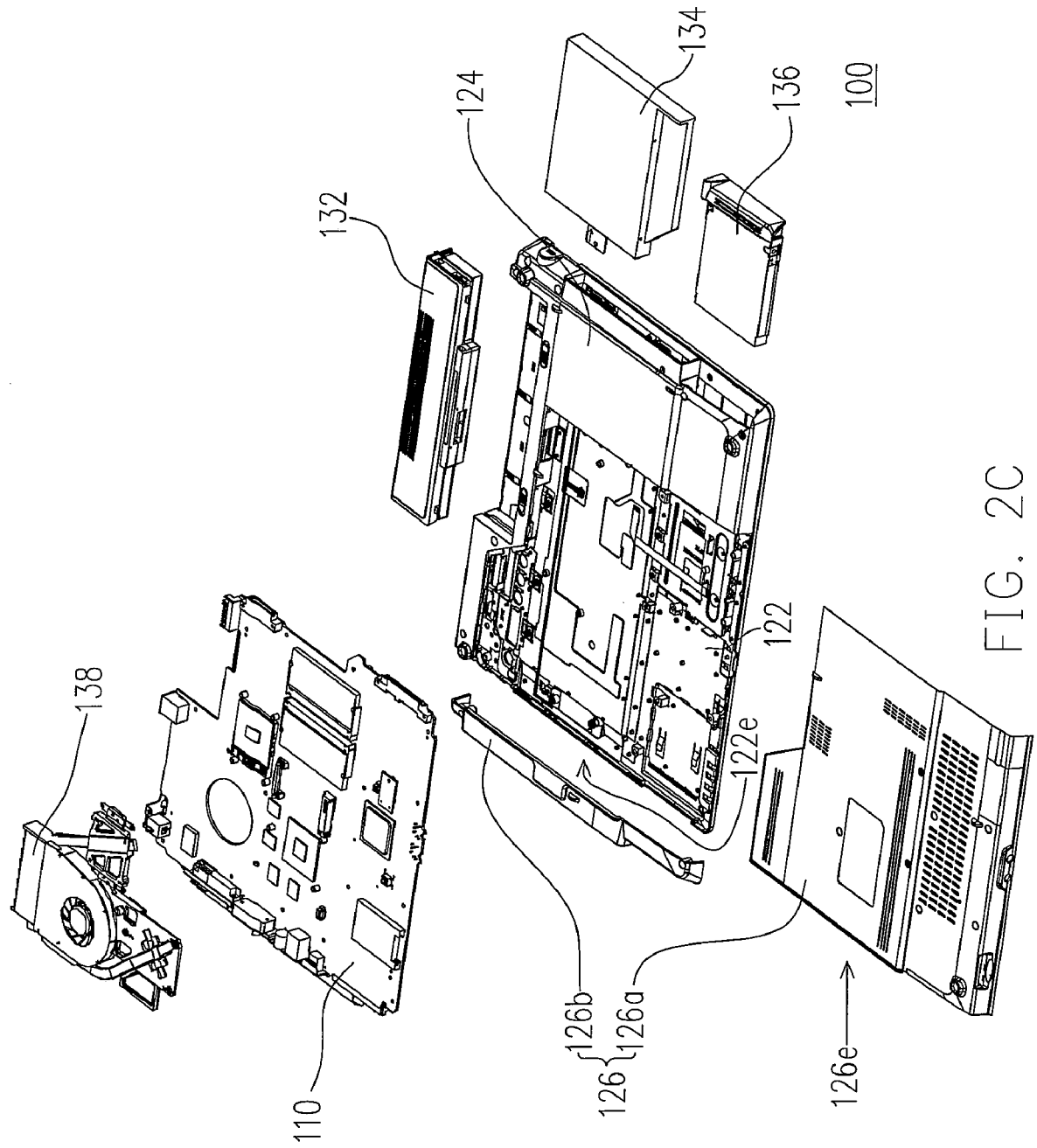
FIG. 2C is an exploded view of the electronic device in FIG. 2A.

FIG. 2A is a perspective view of an electronic device according to an embodiment of the present invention. FIG. 2B is a cross-sectional view of FIG. 2A cut along plane P1 and observed along arrow A. FIG. 2C is an exploded view of the electronic device in FIG. 2A.

Referring to FIGS. 2A~2C, a notebook computer can be described as an example of the electronic device 100 in the present invention. The electronic device 100 includes a circuit board 110, a first housing 122, a second housing 124, and a third housing 126. In the present embodiment, the electronic device 100 further has a battery 132, a CD-ROM 134, a harddisk 136, and a fan 138. However, the present invention is not limited hereto. In other words, in another embodiment, the electronic device 100 may be skipped of some of the aforementioned modules or may further have other modules.

Referring to FIG. 2B, the circuit board 110 is, for example, a motherboard. The circuit board 110 is disposed, for example, in the first housing 122 by using, for example, screws. According to different design, the circuit board 110 may also be disposed in the third housing 126. Besides, the circuit board 110 has a first side 1101 and a second side 1102. Wherein the second side 1102 and the first side 1101 are connected and the first side 1101 has at least one connector 112. Wherein the connector 112 is, for example, an I/O connector. The second housing 124 covers a portion of the second side 1102, and the third housing 126 covers the first side 1101 and another portion of the second side 1102 of the circuit board 110. In the present embodiment, the circuit board 110 is between the first housing 122 and the second housing 124. However, in another embodiment, at least a portion of the circuit board 110 is between the first housing 122 and the second housing 124, and the first side 1101 may be at outside of the first housing 122 and the second housing 124.

In the present embodiment, the first width W21 of the first housing 122 is, for example, greater than the second width W22 of the second housing 124. However, in another embodiment, the first width W21 of the first housing 122 is substantially equal to the second width W22 of the second housing 124. Here the first housing 122 and the second housing 124 do not cover the connector 112.

As shown in FIG. 2B, the first housing 122 and the second housing 124 are connected and form a containing space Si0 and an opening. In particular, the opening is between the first connect edge 122e of the first housing 122 and the second connect edge 124e of the second housing 124. The first connect edge 122e is located at the outermost of the first housing 122, and the second connect edge 124e is located at the outermost of the second housing 124. The third housing 126 is connected with the first connect edge 122e of the first housing 122 and the second connect edge 124e of the second housing 124 to cover the opening. In addition, a circuit board disposition region R10 is disposed on the first housing 122, the circuit board 110 is disposed in the containing space S10 on the circuit board disposition region R10, and part of the circuit board 110 is exposed at the foregoing opening. The first side 1101 of the circuit board 110 is at the foregoing opening. On the other hand, the circuit board 110 and the second housing 124 may both at the second side 122s of the first housing 122. The third housing 126 covers the first side 1101 of the circuit board 110. In the present embodiment, the first housing 122, the second housing 124, and the third housing 126, for example, cover the circuit board 110 all together; however, the present invention is not limited hereto. For example, if the electronic device 100 has a removable hard disk or a battery, then the first housing 122, the second housing 124, and the third housing 126 do not cover the circuit board 110 all together.

Moreover, the electronic device 100 has, for example, a display module (not shown), such as an LCD module, electrically connected to the circuit board 110 for displaying images. In an embodiment, with a notebook computer as example, the display module is, for example, rotatablely connected to the first housing 122, the second housing 124, or the third housing 126. In another embodiment, with flat panel computer as example, the display module is, for example, disposed on the first housing 122 and electrically connected to the circuit board 110 for displaying images. Besides, keyboard module and touch pad module (not shown) can be further disposed on the first housing 122, and electrically connected to the circuit board 110 for users to input signals. In addition, the internal surfaces of the first housing 122, the second housing 124, and the third housing 126 respectively have a metal layer 140 for preventing electromagnetic interference. Wherein the metal layers 140 are, for example, in contact with each other and have ground terminals.

Referring to FIGS. 2A~2C again, the third housing 126 has at least one connector hole O10, and the connector 112 is at the connector hole O10. Besides, in the present embodiment, the third housing 126 can be divided into the fourth housing 126a and the fifth housing 126b. However, in another embodiment, the third housing 126 can be one-time shaped. Here the third housing 126 is, for example, in L shape, which will be described below. The first housing 122, the second housing 124, and the fourth housing 126a can be connected to form an opening. In particular, the opening is between the edge 122e of the first housing 122 and the edge 126e of the fourth housing 126a. In addition, the first side 1101 of the circuit board 110 may be at the opening, and the fifth housing 126b may cover the opening. The fifth housing 126b, for example, has the connector hole O10.

FIG. 2D is a perspective view of the fifth housing illustrated from a different angle as in FIG. 2C. As shown in FIG. 2D, the fifth housing 126b has the connector hole O10. In the present embodiment, there are totally 6 kinds of connector holes O10; however, the number and type of connector hole O10 are not limited in the present invention. The positions of the connector holes O10 are formed correspondingly to that of the connectors 112 on the circuit board 110 (shown in FIG. 2B).

As described above, the electronic device in the embodiment described above has at least following advantages:

1. the area covered by the third housing 126 is approximately the same as the circuit board disposition region R10, thus, it is possible to open only the third housing 126 during maintenance to individually maintain or replace the circuit board 110. Accordingly, the maintenance of electronic device 100 is made more convenient.

2. when new circuit board is replaced, only the fifth housing 126b having the connector hole O10 needs to be replaced if the new circuit board has different type of connector or different connector position. Since the fifth housing 126b is in strip shape and it only occupies a small portion of all the housings, the cost for replacing the housings can be reduced.

3. when replacing or inspecting the connector 112, the fourth housing 126a has to be disassembled first before disassembling the fifth housing 126b. Similarly, when replacing or inspecting the circuit board 110, the fourth housing 126a has to be disassembled first before disassembling the fifth housing 126b. In the electronic device of the present invention, these two maintenance and inspections have similar steps of disassembling housings, thus, the mechanics can master the operations quickly even though there are up to 4 housings. In other words, the housings disassembly steps are very straightforward to mechanics and won't cause any misunderstanding.

Figure 3A:
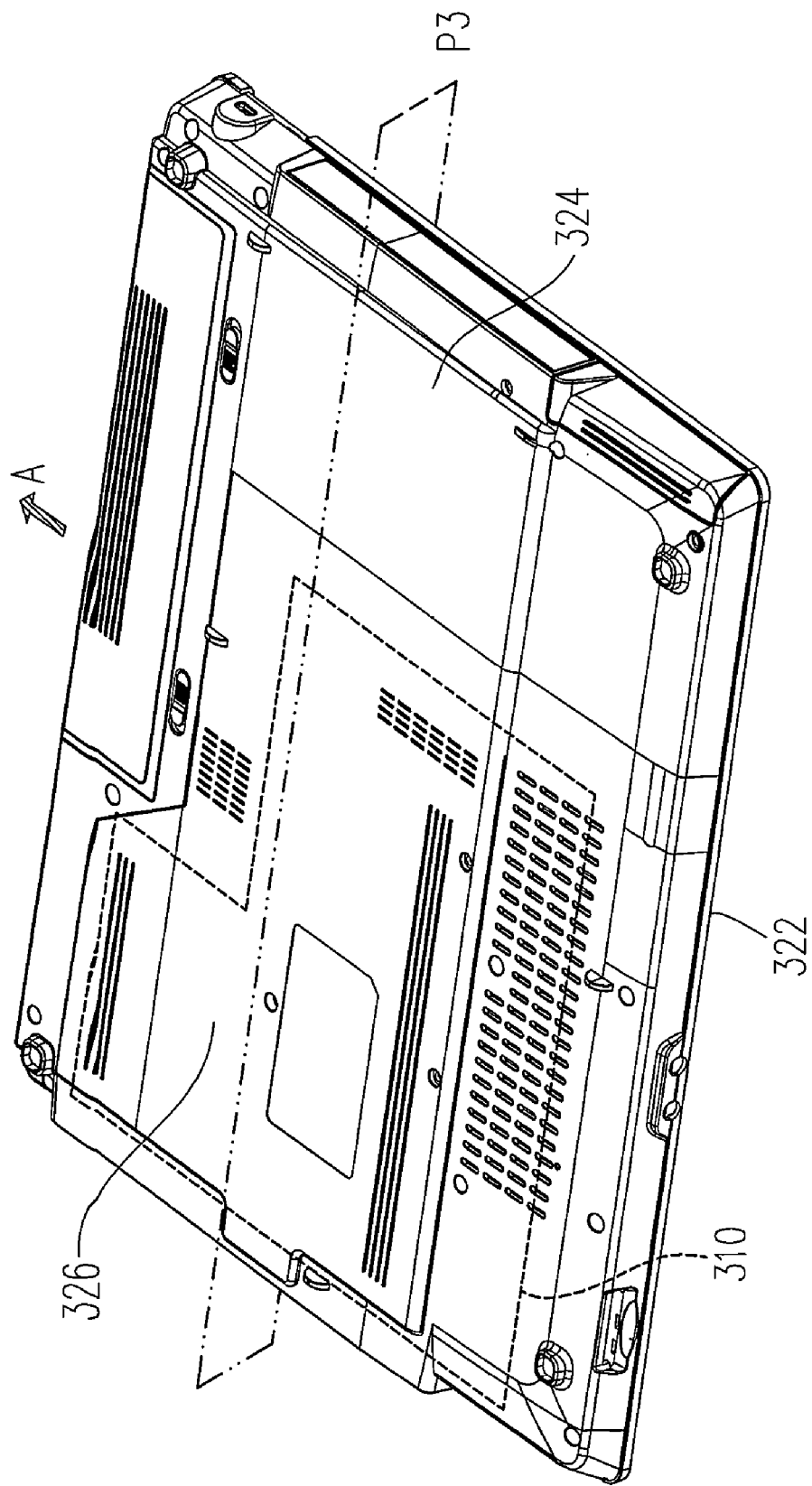
FIG. 3A is a perspective view of an electronic device according to another embodiment of the present invention.
Figure 3B:
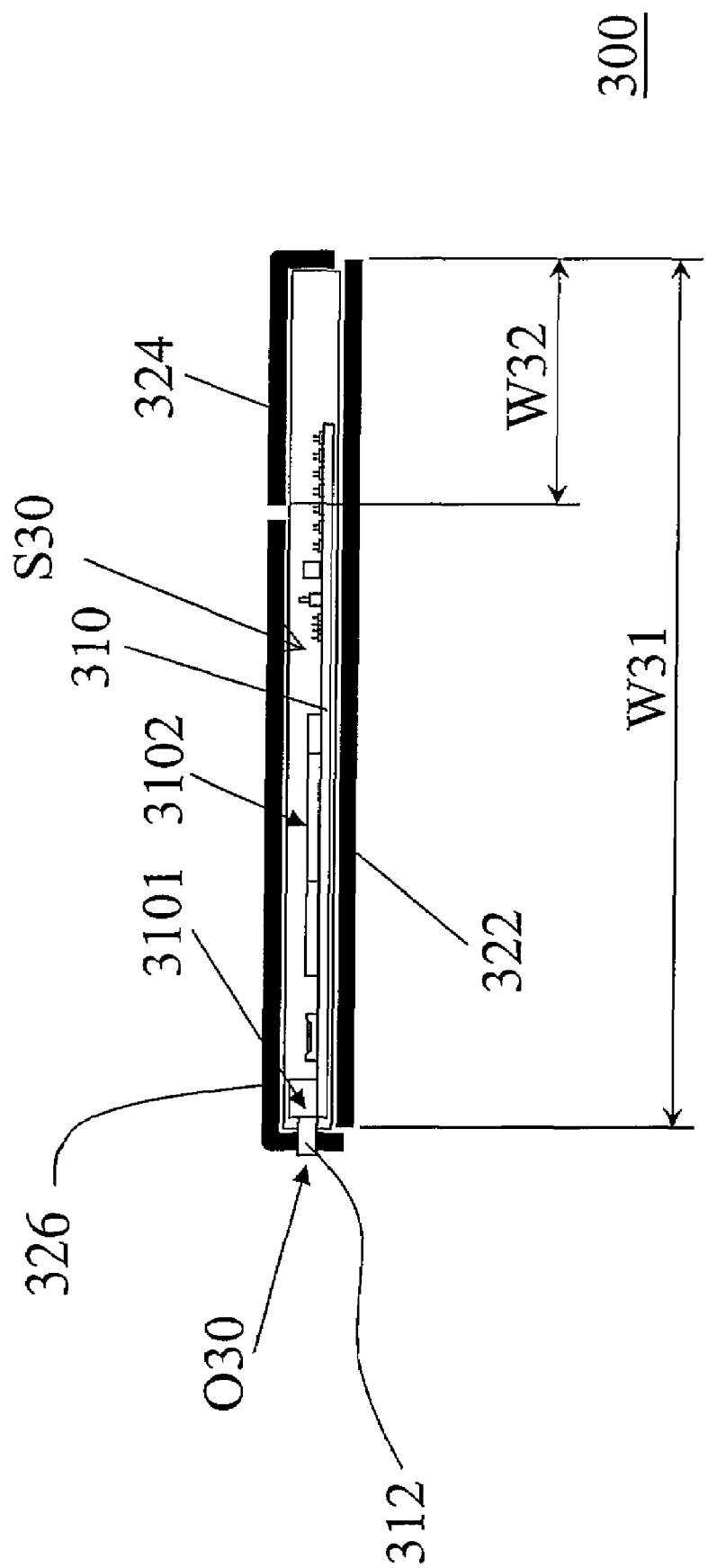
FIG. 3B is a cross-sectional view of FIG. 3A cut along plane P3 and observed along arrow A.
Figure 4A:
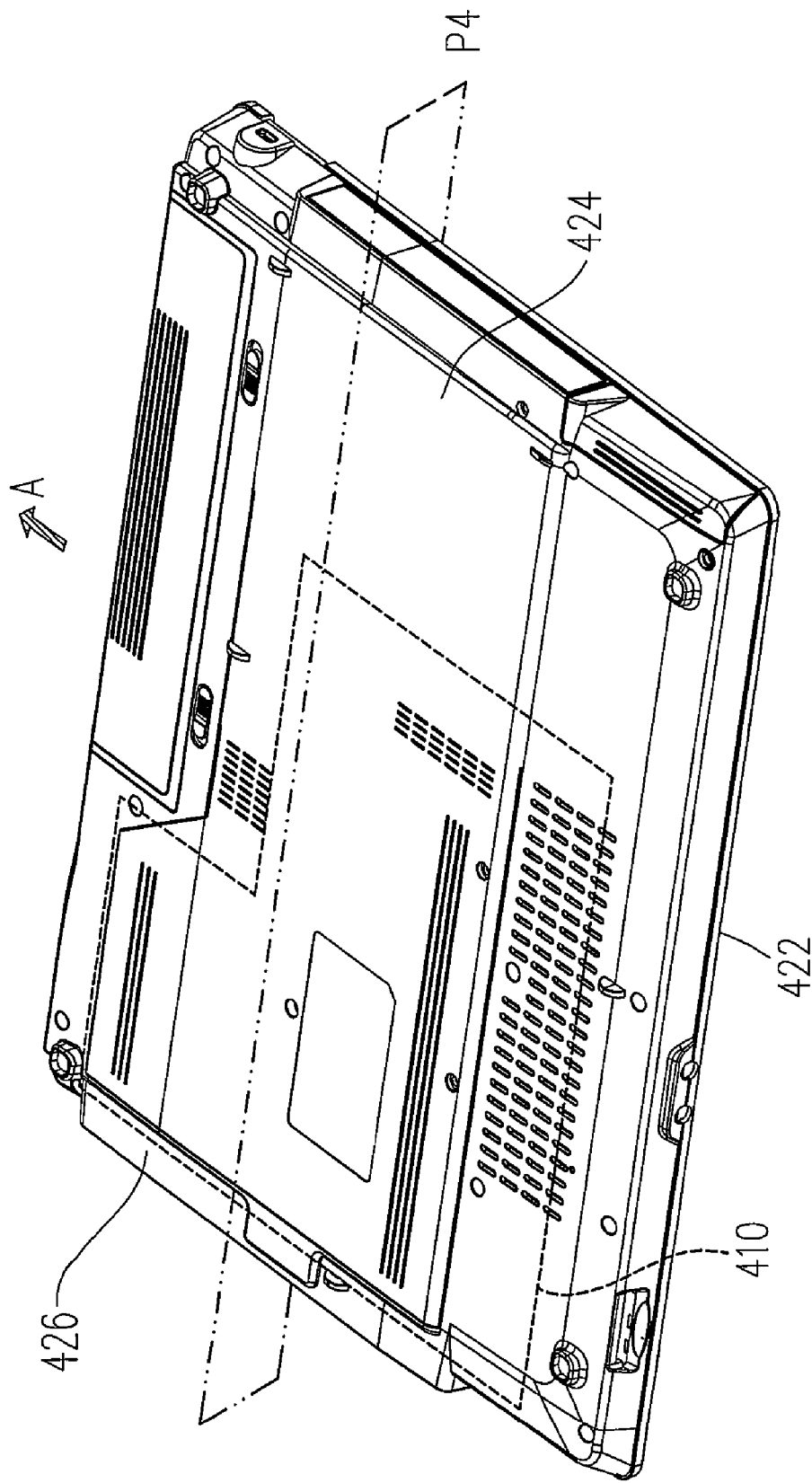
FIG. 4A is a perspective view of an electronic device according to yet another embodiment of the present invention.
Figure 4B:
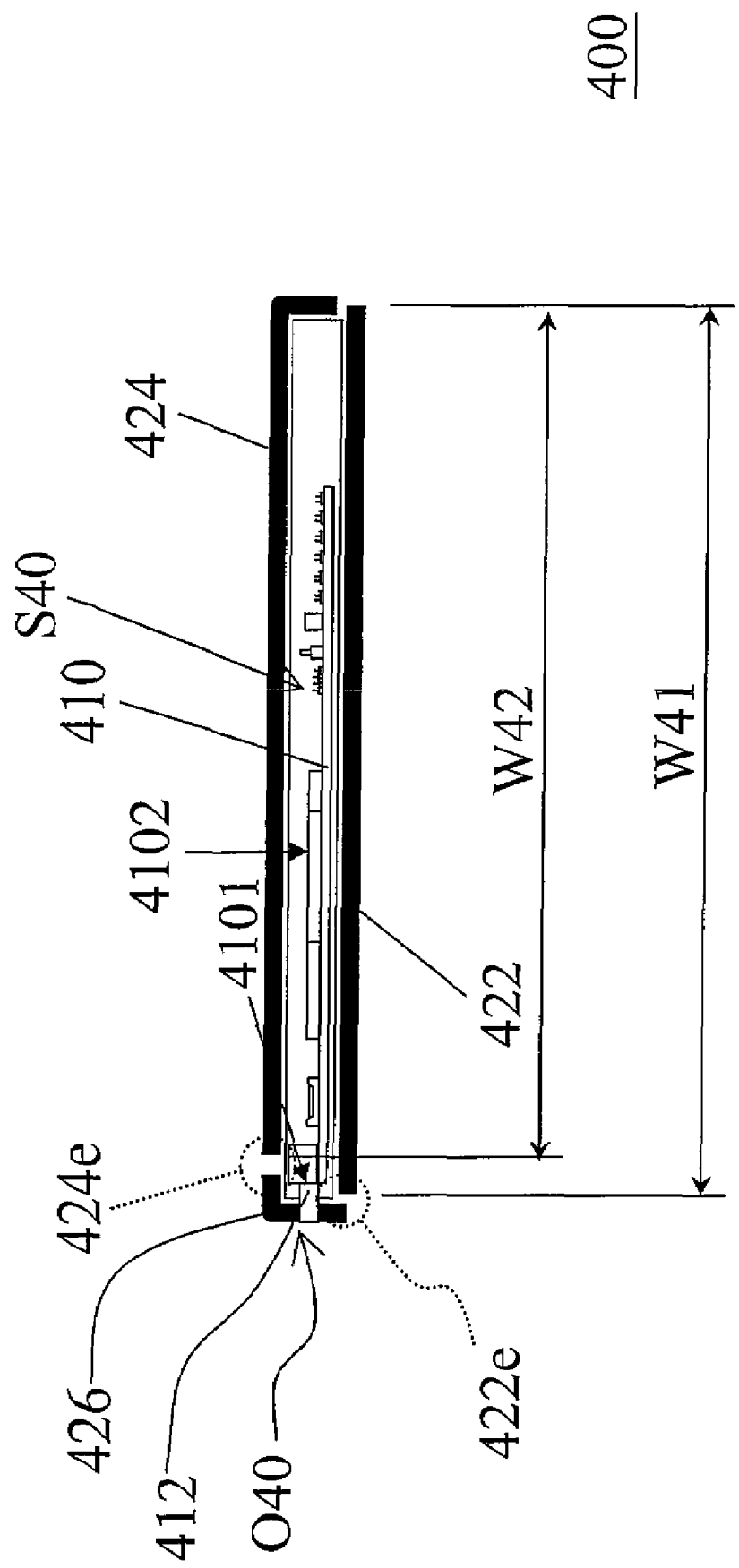
FIG. 4B is a cross-sectional view of FIG. 4A cut along plane P4 and observed along arrow A.

Below, some other embodiments of the electronic device in the present invention will be described with reference to figures. FIG. 3A is a perspective view of an electronic device according to another embodiment of the present invention, and FIG. 3B is a cross-sectional view of FIG. 3A cut along plane P3 and observed along arrow A. FIG. 4A is a perspective view of an electronic device according to yet another embodiment of the present invention, and FIG. 4B is a cross-sectional view of FIG. 4A cut along plane P4 and observed along arrow A. Wherein like reference numerals refer to the like modules or elements throughout and repeated descriptions are skipped.

Referring to FIG. 3A and FIG. 3B, in the present embodiment, the first housing 322 and the second housing 324 form a containing space S30, and the circuit board 310 is disposed in the containing space S30. Wherein the first width W31 of the first housing 322 is, for example, greater than the second width W32 of the second housing 324. In such case, the first housing 322 and the second housing 324 do not cover the connector 312. The circuit board 310 is, for example, disposed in the first housing 322. The circuit board 310 has a first side 3101 and a second side 3102, and the second side 3102 is connected to the first side 3101. The first side 3101 has at least one connector 312. Besides, as shown in FIG. 3B, the second housing 324 covers, for example, a portion of the second side 3102, and the third housing 326 covers the first side 3101 and another portion of the second side 3102 of the third housing 326. The circuit board 310 is between the first housing 322 and the second housing 324. In the present embodiment, the first housing 322, the second housing 324, and the third housing 326, for example, cover the circuit board 310 all together. The third housing 326 is, for example, fixed to the first housing 322 and the second housing 324. In addition, the third housing 326 has at least one connector hole O30, and the connector 312 is at the connector hole O30. As shown in FIG. 3A, the third housing 326 in the present embodiment is in L shape. Besides, the connector 312 is, for example, an I/O connector (not shown). Complicated disassembly procedure can be avoided when maintaining or replacing the circuit board 310 of the electronic device 300 in FIG. 3A. On the other hand, compared to the electronic device 100 in FIG. 2B, the electronic device 300 in FIG. 3B has the one-time shaping third housing 326 which can reduce the cost of molding process.

Referring to FIG. 3A, FIG. 4A, and FIG. 4B, the difference between the electronic device 400 and the electronic device 300 is that the circuit board 410 of the electronic device 400 in FIG. 4A is disposed between the first housing 422 and the second housing 424, and the third housing 426 may be in strip shape. A first connect edge 422e is located at the outermost of the first housing 422, and a second connect edge 424e is located at the outermost of the second housing 424. The third housing 426 is connected with the first connect edge 422e of the first housing 422 and the second connect edge 424e of the second housing 424 to cover the opening therebetween. The circuit board 410 has at least one connector 412 on at least a first side 4101. Wherein the connector 412 is, for example, an I/O connector. The first housing 422 and the second housing 424 are connected to each other and form a containing space S40 and an opening. In particular, the opening is between the first connect edge 422e of the first housing 422 and the second connect edge 424e of the second housing 424. The circuit board 410 is disposed in the containing space S40, and part of the circuit board 410 is exposed at the foregoing opening. The first side 4101 is at the foregoing opening. Besides, the third housing 426 covers the foregoing opening. Wherein the third housing 426 has at least one connector hole O40 with position formed correspondingly to that of the connector 412 on the circuit board 410 and the connector 412 is at the connector hole O40.

In the present embodiment, as shown in FIG. 4B, at least a portion of the circuit board 410 is between the first housing 422 and the second housing 424, and the first side 4101 of the circuit board 410 is at outside of the first housing 422 and the second housing 424. However, the present invention is not limited hereto; in other words, the whole circuit board 410 may be between the first housing 422 and the second housing 424. In this case, the first width W41 of the first housing 422 is substantially equal to the second width W42 of the second housing 424, and the first housing 422 and the second housing 424 do not cover the connector 412. However, as shown in FIG. 4B, in the present embodiment, the first width W41 of the first housing 422 is greater than the second width W42 of the second housing 424. On the other hand, in the present embodiment, the third housing 426 is, for example, connected to the first housing 422 and the second housing 424.

In addition, the first housing 422, the second housing 424, and the third housing 426, for example, cover the circuit board 410 all together, however the present invention is not limited hereto. For example, if the electronic device 400 has such unit as a removable harddisk or a battery, the first housing 422, the second housing 424, and the third housing 426 do not cover the circuit board 410 all together.

Since only the third housing 426 needs to be disassembled for maintaining the connector 412, the maintenance of connector 412 becomes very convenient. The structure of the electronic device 400 in FIG. 4A makes the maintenance of the connector 412 to be more convenient. Besides, if new circuit board has to be replaced and the new circuit board has different type of connector or different connector position, only the third housing 426 having the connector hole O40 needs to be replaced. The third housing 426 is in strip shape and only occupies a small portion of all the housings, thus, the cost of housing replacement can be reduced. Moreover, the electronic device 100 in FIG. 2A has 4 housings while the electronic device 400 in FIG. 4A has only 3 housings, the less the number of housings is, the less the cost of molding process is.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
    a circuit board, having at least two connectors;
    a first housing, with a first connect edge, the first connect edge located at the outermost of the first housing;
    a second housing, with a second connect edge, the second connect edge located at outermost of the second housing, the first housing and the second housing being connected together and forming a containing space and an opening, the circuit board being disposed in the containing space, and part of the circuit board exposing at the opening; and
    a third housing, connected with the first connect edge of the first housing and the second connect edge of the second housing to cover the opening, the third housing having at least two connector holes, the third housing being configured at a periphery of the containing space, wherein the positions of the connector holes are formed correspondingly to that of the connectors on the circuit board.

2. The electronic device as claimed in claim 1, wherein at least a portion of the circuit board is between the first and the second housing, the connectors of the circuit board is at an outside of the first and the second housing.

3. The electronic device as claimed in claim 1, wherein the first, the second, and the third housing cover the circuit board all together.

4. The electronic device as claimed in claim 1, wherein the third housing is connected to the first and the second housing, a first width of the first housing is substantially equal to a second width of the second housing, and the first and the second housing do not cover the connectors.

5. The electronic device as claimed in claim 1, wherein the connector is an I/O connector.

6. The electronic device as claimed in claim 1, wherein the containing space of the electronic device further comprise an optical disk device, the optical disk device being disposed at opposite side of the opening and connected to the circuit board.

7. An electronic device, comprising:
    a first housing, with a first connect edge, the first connect edge located at the outermost of the first housing;
    a circuit board, having a first side and a second side, the second side being connected to the first side, the first side having at least two connectors;
    a second housing, with a second connect edge, the second connect edge located at outermost of the second housing, connected to the first housing, covering a portion of the second side of the circuit board, the circuit board being between the first and the second housing; and
    a third housing, connected with the first connect edge of the first housing and the second connect edge of the second housing to cover the first side and another portion of the second side of the circuit board, the third housing having at least two connector holes, the positions of the connector holes are formed correspondingly to that of the connectors on the circuit board, wherein the third housing comprises:
        a fourth housing, the first, the second, and the fourth housing being connected and forming a containing space and an opening, the first side of the circuit board being at the opening; and
        a fifth housing, covering the opening, having the connector holes, the fifth housing being configured at a periphery of the containing space.

8. The electronic device as claimed in claim 7, wherein the circuit board is disposed in the first housing.

9. The electronic device as claimed in claim 7, wherein a first width of the first housing is greater than a second width of the second housing, and the first and the second housing do not cover the connectors.

10. The electronic device as claimed in claim 7, wherein the third housing is in L shape.

11. The electronic device as claimed in claim 7, further comprise an optical disk device, the optical disk device being disposed at opposite side of the first side of the circuit board and connected to the circuit board.

* * * * *